(12) United States Patent
Uriel

(10) Patent No.: US 10,848,408 B2
(45) Date of Patent: Nov. 24, 2020

(54) METHODS AND APPARATUS TO CONTROL COMPUTING RESOURCE UTILIZATION OF MONITORING AGENTS

(71) Applicant: VMware, Inc., Palo Alto, CA (US)

(72) Inventor: Ilan Uriel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 450 days.

(21) Appl. No.: 14/669,643

(22) Filed: Mar. 26, 2015

(65) Prior Publication Data

US 2016/0285783 A1 Sep. 29, 2016

(51) Int. Cl.
*H04L 12/26* (2006.01)
*G06F 11/30* (2006.01)

(52) U.S. Cl.
CPC .......... *H04L 43/0876* (2013.01); *G06F 11/30* (2013.01); *H04L 43/16* (2013.01)

(58) Field of Classification Search
CPC .......... G06F 11/30–3096; H04L 43/08–0894; H04L 43/16
See application file for complete search history.

(56) References Cited

U.S. PATENT DOCUMENTS

| | | | | |
|---|---|---|---|---|
| 5,958,009 A * | 9/1999 | Friedrich | ................. | H04L 43/00 709/224 |
| 7,705,721 B1 * | 4/2010 | Chen | ....................... | G06F 11/30 340/518 |
| 9,292,406 B2 * | 3/2016 | Karayi | ................... | G06F 1/3209 |
| 2002/0083169 A1 * | 6/2002 | Aki | .......................... | H04L 43/00 709/224 |
| 2003/0135382 A1 * | 7/2003 | Marejka | .............. | G06F 11/0709 709/232 |
| 2005/0235285 A1 * | 10/2005 | Monasterio | ........... | G06F 9/4843 718/100 |
| 2007/0211548 A1 * | 9/2007 | Jain | ......................... | G11C 5/04 365/211 |
| 2010/0094990 A1 * | 4/2010 | Ben-Yehuda | ....... | G06F 11/3409 709/224 |
| 2011/0218770 A1 * | 9/2011 | Ii | ............................. | G06F 11/30 702/182 |
| 2011/0276840 A1 * | 11/2011 | Fresson | ................. | G06F 11/076 714/47.2 |
| 2011/0295823 A1 * | 12/2011 | Sathish | ............. | G06F 17/30294 707/705 |
| 2012/0060173 A1 * | 3/2012 | Malnati | ............... | G06F 11/3055 719/318 |
| 2012/0209568 A1 * | 8/2012 | Arndt | .................. | G06F 11/3089 702/183 |

(Continued)

*Primary Examiner* — David R Lazaro
*Assistant Examiner* — Julian Chang
(74) *Attorney, Agent, or Firm* — Hanley, Flight & Zimmerman, LLC

(57) ABSTRACT

Methods, apparatus, systems and articles of manufacture to control computing resource utilization of monitoring agents. An example method includes instructing a monitoring agent of a compute node to perform a first monitoring operation associated with a first monitoring level. In response to the first monitoring operation returning a first result that is outside of an acceptable threshold, a second monitoring level is identified. The second monitoring level is associated with a second monitoring operation that is allocated more computing resources than the first monitoring operation associated with the first monitoring level.

22 Claims, 6 Drawing Sheets

(56) References Cited

U.S. PATENT DOCUMENTS

| | | | |
|---|---|---|---|
| 2013/0114394 A1* | 5/2013 | Hu | H04L 41/0816 370/216 |
| 2013/0151839 A1* | 6/2013 | Rowles | G06F 9/06 713/100 |
| 2013/0170390 A1* | 7/2013 | Umayabashi | H04L 43/0852 370/252 |
| 2013/0283090 A1* | 10/2013 | Bradley | G06F 11/0793 714/2 |
| 2013/0290513 A1* | 10/2013 | Shikari | G06F 9/546 709/224 |
| 2014/0006818 A1* | 1/2014 | Doshi | G06F 1/3203 713/320 |
| 2014/0237110 A1* | 8/2014 | Nakanishi | G06F 11/3055 709/224 |
| 2014/0304553 A1* | 10/2014 | Gondi | G06F 11/0751 714/39 |
| 2014/0344442 A1* | 11/2014 | Crawford | G06F 17/30557 709/224 |
| 2014/0351414 A1* | 11/2014 | Rosensweig | H04L 43/0817 709/224 |
| 2015/0065078 A1* | 3/2015 | Mejia | G08B 17/00 455/404.1 |
| 2015/0113338 A1* | 4/2015 | Maruyama | G06F 11/3037 714/48 |
| 2015/0149826 A1* | 5/2015 | Anderson | G06F 11/3476 714/37 |
| 2015/0186245 A1* | 7/2015 | Hoen, IV | H04L 43/04 714/45 |
| 2016/0077125 A1* | 3/2016 | Buck | G01C 21/16 73/1.38 |
| 2016/0092363 A1* | 3/2016 | Wang | G06F 11/3409 711/119 |
| 2016/0094401 A1* | 3/2016 | Anwar | H04L 41/142 709/223 |
| 2016/0196157 A1* | 7/2016 | Kodama | G06F 9/45558 718/1 |
| 2016/0328247 A1* | 11/2016 | Uriel | G06F 11/3024 |
| 2017/0010948 A1* | 1/2017 | Kumar | G06F 11/3051 |
| 2017/0060660 A1* | 3/2017 | Gondi | G06F 11/0709 |

\* cited by examiner

300

| | 305 | 310 | 315 |
|---|---|---|---|
| | MONITORING LEVEL | TESTING FREQUENCY | SAFE STATE THRESHOLD |
| 330 | 0 | 5 MINUTES | N/A |
| 350 | 1 | 2 MINUTES | ALL TESTS PASS FOR AT LEAST 20 MINUTES |
| 370 | 2 | 1 MINUTE | ALL TESTS PASS FOR AT LEAST 10 MINUTES |

| | 305 | 410 | 415 |
|---|---|---|---|
| | MONITORING LEVEL | MONITORING OPERATION | FAILURE CONDITION |
| 430 | 0 | PROCESSOR UTILIZATION | >40% PROCESSOR UTILIZATION |
| 435 | 0 | MEMORY UTILIZATION | >75% MEMORY UTILIZATION |
| 450 | 1 | PROCESSOR UTILIZATION | >50% PROCESSOR UTILIZATION |
| 455 | 1 | MEMORY UTILIZATION | >75% MEMORY UTILIZATION |
| 460 | 1 | DATABASE RESPONSE TIME | >100ms RESPONSE TIME |
| 470 | 2 | PROCESSOR UTILIZATION | >50% PROCESSOR UTILIZATION |
| 475 | 2 | MEMORY UTILIZATION | >75% MEMORY UTILIZATION |
| 480 | 2 | DATABASE RESPONSE TIME | >100ms RESPONSE TIME |
| 485 | 2 | DISK LATENCY | >100ms WRITE/READ LATENCY |

FIG. 4

METHODS AND APPARATUS TO CONTROL COMPUTING RESOURCE UTILIZATION OF MONITORING AGENTS

FIELD OF THE DISCLOSURE

This disclosure relates generally to computing resource utilization, and, more particularly, to methods and apparatus to control computing resource utilization of monitoring agents.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables efficient deployment of computing resources within an enterprise. For example IaaS systems may enable developers to build, deploy, and manage the lifecycle of a web application (or any other type of networked application) at a greater scale and at a faster pace than before. Server administrators seek to monitor the computing platforms to prevent and/or understand failure conditions.

BRIEF DESCRIPTION OF THE DRAWINGS

FIG. 3 is an example data table indicating parameters for example monitoring levels to be utilized by the example monitoring resource controller of FIG. 1.

FIG. 4 is an example data table indicating example monitoring operations to be performed and failure conditions associated with those monitoring operations for the corresponding monitoring levels of FIG. 3.

Wherever possible, the same reference numbers will be used throughout the drawing(s) and accompanying written description to refer to the same or like parts.

DETAILED DESCRIPTION

Figure 1:
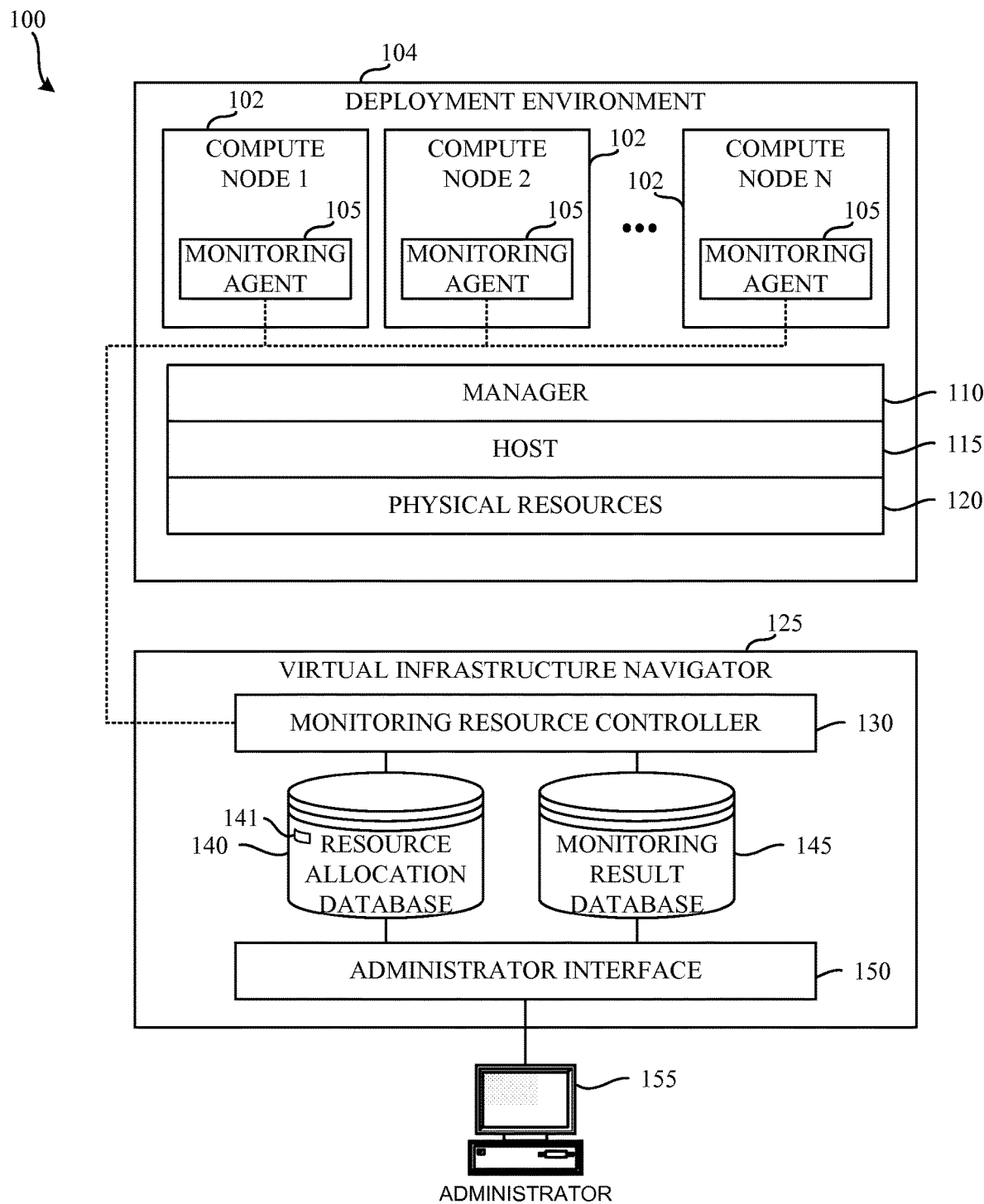
FIG. 1 is a block diagram of an example system constructed in accordance with the teachings of this disclosure to control monitoring resource utilization of a compute node.

Virtual computing services enable one or more compute nodes (CN) to be hosted within a deployment environment. As disclosed herein, a CN is a computing resource (physical or virtual) that may host a wide variety of different applications such as, for example, an email server, a database server, a file server, a web server, etc. CNs include physical hosts (e.g., non-virtual computing resources such as servers, processors, computers, etc.), virtual machines (VM), containers that run on top of a host operating system without the need for a hypervisor or separate operating system, hypervisor kernel network interface modules, etc. In some examples, a CN may be referred to as a data computer end node or as an addressable node.

VMs operate with their own guest operating system on a host using resources of the host virtualized by virtualization software (e.g., a hypervisor, virtual machine monitor, etc.). Numerous VMs can run on a single computer or processor system in a logically separated environments (e.g., separated from one another). A VM can execute instances of applications and/or programs separate from application and/or program instances executed by other VMs on the same computer.

In examples disclosed herein, containers are virtual constructs that run on top of a host operating system without the need for a hypervisor or a separate guest operating system. Containers can provide multiple execution environments within an operating system. Like VMs, containers also logically separate their contents (e.g., applications and/or programs) from one another, and numerous containers can run on a single computer or processor system. In some examples, utilizing containers, a host operating system uses name spaces to isolate containers from each other to provide operating-system level segregation of applications that operate within each of the different containers. This segregation can be viewed as a form of virtualization that isolates different groups of applications that operate in different containers. In some examples, such containers are more lightweight than VMs.

To monitor the operation of a CN, one or more monitoring agents (e.g., a monitoring program, a monitoring command, etc.) are executed by the CN. Information provided by the monitoring agents may be useful in identifying a problem and/or a cause of the problem (e.g., a root cause) with the CN (e.g., a misconfiguration in a database, a program that frequently crashes, etc.). Executing monitoring agent(s) by the CN consumes resources (e.g., physical resources) allocated to the CN. Managing resource utilization in a cloud environment is a challenging task, made even more difficult when recognizing that operations to monitor resource utilization and detect problem conditions also consume the same limited resources that are being monitored.

Computing resource providers (e.g., cloud computing resource providers) have a variety of cost structures. However, in general, additional commands and/or processes executed by a virtual machine consume additional resources and, in turn, incur more costs to operate. For example, a CN implementing a web server that responds to millions of requests daily may consume more resources and, in turn, cost more to operate, than a CN operating a web server that responds to ten requests daily.

In some examples, virtual computing customers are provided with a service level agreement (SLA) by the service provider(s) hosting the CN(s). The SLA defines service level thresholds to be maintained by the service provider(s) such as, for example, an uptime requirement of 99.5%, a minimum memory allocation of sixteen gigabytes, up to 3.2 million seconds of compute time in a time period (e.g., one month, one week, etc.), etc.

As noted above, monitoring agents executed by the CN consume resources allocated to the CN. In view of the SLA limits, cost, etc., virtual computing customers are wary of allocating resources to functionality other than their desired processes (e.g., an email server, a file server, a database, etc.). Virtual computing customers, in an attempt to limit resource utilization, may disable monitoring agents. In scenarios where the CN is operating properly, results of the monitoring agents may not be a concern. However, in a time of crisis (e.g., when a server is malfunctioning and/or non-responsive), such monitoring agents can provide useful information for addressing a problem with the CN. In such a situation, if the monitoring agents were disabled, information for addressing a problem with a CN may not be available (e.g., even if the monitoring agent were enabled at the time a problem is discovered, information prior to and/or at the time that the problem occurred will likely not be available).

Example methods and apparatus disclosed herein provide dynamic resource allocation for monitoring agents. In examples disclosed herein, resources are allocated to monitoring agents by controlling a frequency at which monitoring operations are performed by the monitoring agents (e.g., to control the total number of operations and, thus, computing resources utilized over a period of time). In examples disclosed herein, resources are dynamically allocated using different monitoring levels corresponding to different frequencies at which monitoring operations are performed and/or the types of monitoring operations that are performed. Additionally or alternatively, resources may be allocated in any other fashion, such as, for example, by indicating that a monitoring operation is to consume no more than a particular percentage of resources (e.g., ten percent processor utilization), indicating that a monitoring operation is to consume no more than a given networking bandwidth, etc.

FIG. 1 is a block diagram of an example system 100 constructed in accordance with the teachings of this disclosure to control monitoring resource utilization of one or more example CNs 102 deployed in deployment environment 104. Monitoring resource utilization is controlled by an example virtual infrastructure navigator (VIN) 125. The example VIN 125 is administered by an administrator 155.

As noted above, the example deployment environment 104 includes one or more CNs 102. In the illustrated example of FIG. 1, the example deployment environment includes a manager 110, a host 115, and physical resources 120.

As used herein, the term "deployment environment" refers to a computing environment in, for example, a cloud platform provider (also referred to herein as a "cloud provider"). In some examples, separate deployment environments 104 may be used for development, testing, staging, and/or production. An example cloud provider can have one or multiple deployment environments.

The CNs 102 may include non-virtualized physical hosts, virtual machines (VM), containers (e.g., Docker® containers, etc.), hypervisor kernel network interface modules, etc. The example CNs 102 include an example monitoring agent 105 that executes monitoring operations for their respective CNs 102 to monitor resource utilization (e.g., to identify a level of processor utilization, to identify a level of memory utilization, to identify a network latency of a CN, to identify a query latency of a database hosted by a CN, etc.).

In some examples, the example deployment environment 104 of FIG. 1 includes one or more physical machines having the example physical resources 120. In the illustrated example, the host 115 manages the physical resources 120 (e.g., processor(s), memory, storage, peripheral devices, network access, etc.) of the physical machine(s). The example host 115 is a native operating system (OS) executing on the physical resources 120. In the illustrated example of FIG. 1, the host 115 executes the example manager 110. In some examples, the manager 110 is a virtual machine manager (VMM) that instantiates virtualized hardware (e.g., virtualized storage, virtualized memory, virtualized processors(s), etc.) from underlying physical hardware. In some examples, the manager 110 is a container engine that enforces isolation of physical resources 120 and/or an environment of the host 115 to isolate the CNs 102. As used herein, isolation means that the container engine manages a first container executing instances of applications and/or programs separate from a second (or other) container for the physical resources 120.

In the illustrated example of FIG. 1, the example CNs 102 execute within the example deployment environment 104 managed by the example manager 110. In some examples, one or more of the CNs 102 is a VM executing a guest OS (e.g., a Windows operating system, a Linux operating system, etc.) that accesses virtualized hardware instantiated by the manager 110 (e.g., a VMM, etc.). In some such examples, the one or more of the CNs 102 executes multiple applications and/or services. Additionally or alternatively, in some examples, one or more of the CNs 102 is a container. In some such examples, the one or more of the CNs 102 is isolated (e.g. via name spaces, etc.) by the manager 110 (e.g., a container engine, etc.) from other ones of the CNs 102 executing on the physical resources 120. Typically, such container-based CNs execute a single application and/or service and do not execute a guest OS.

In the illustrated example, the CNs 102 execute corresponding ones of the monitoring agents 105 to monitor operation(s) of their respective one of the CNs 102. The example monitoring agents 105 are configured with permissions required to monitor the respective one of the CNs 102 in response to a monitoring instruction received from a monitoring resource controller 130 of the example VIN 125. In response to execution of the monitoring instruction received from the example monitoring resource controller 130, the example monitoring agent 105 reports a result of the executed instruction. In some examples, the monitoring agents 105 execute directly on the CNs 102 (e.g., when the CNs 102 are VMs or non-virtualized physical machines, etc.). In some examples, the monitoring agents 105 execute as part of the manager 110 (e.g., when the CNs 102 are containers, etc.). In some examples, when a monitoring agent 105 is installed on one of the CNs 102, the monitoring agent 105 establishes communication with the example monitoring resource controller 130.

Example methods and apparatus disclosed herein facilitate the automatic management of monitoring agents 105 deployed in the example CNs 102 by the VIN 125 (e.g., vCenter™ Infrastructure Navigator™, a commercially available product from VMWare®, Inc.) or similar component. The example VIN 125 includes the monitoring resource controller 130, a resource allocation database 140, the example monitoring profile 141, a monitoring result database 145, and an administrator interface 150. The example VIN 125 enables a user (e.g., a virtual infrastructure administrator 155, etc.) to define one or more monitoring profiles for the CNs 102. In examples disclosed herein, the example VIN 125 automatically detects services running on the CNs 102 (e.g., a virtual machine, a physical machine, etc.) to determine which monitoring profile should be used when monitoring one or more of the example CNs 102. As used herein, the term "service" refers to software that can be installed on the CNs 102 and may be reused in multiple applications. In some examples, the services automatically detected by the example VIN 125 are compared to service rules. If an automatically detected service matches a service rule (e.g., the automatically detected service is identified in the service rule), the monitoring agent 105 is installed and/or configured on the one of the CNs 102 running the service without further intervention from the user.

The example monitoring resource controller 130 of the example VIN 125 manages monitoring operations performed by the monitoring agent(s) 105. Controlling monitoring operations performed by the monitoring agent(s) 105 enables control of the resources utilized by those monitoring agent(s) 105. For example, executing resource intensive monitoring operations (e.g., querying a database to determine a database latency) will consume more computing resources than a monitoring operation that is not resource intensive (e.g., determining a level of processor utilization, etc.) Further, the frequency with which the monitoring operations are performed will affect consumption of computing resources (e.g., frequent polling of the processor utilization will consume more resources than infrequent polling). An example implementation of the example monitoring resource controller 130 is disclosed in connection with the example of FIG. 2.

When one of the example CNs 102 is operating stably and properly, the example monitoring resource controller 130 instructs the example monitoring agent 105 associated with the one of the CNs 102 to perform one or more monitoring operation(s) that does not have a large impact on the resources consumed by the one of the CNs 102. In some examples, the example monitoring resource controller 130 may also instruct the example monitoring agent 105 to perform the monitoring operation(s) infrequently. Instructing the example monitoring agent 105 to perform a monitoring operation (e.g., execute a command, execute a script, etc.) at a frequency that does not have a large impact on the resources consumed by the CN typically results in collection of less information concerning the operation of the CN. For example, a check on processor utilization does not consume many resources of the CN, but, at the same time, provides limited information concerning the operation of the CN. In some examples, when the monitoring operation returns a result that exceeds a threshold (e.g., processor utilization of a CN exceeds a threshold of 50%), the monitoring resource controller 130 instructs the monitoring agent 105 of the respective CN to perform additional monitoring operations and/or perform monitoring operations more frequently that consume additional resources, but provide additional information about the operation of the CN. In some examples, such monitoring operations are performed more frequently.

The example resource allocation database 140 of the illustrated example of FIG. 1 stores resource allocation information such as, for example, an example monitoring profile 141 associated with one or more of the example CNs. To identify the monitoring operations associated with various monitoring levels of monitoring profiles associated with the example CNs 102, the example monitoring resource controller 130 consults the example resource allocation database 140. In the illustrated example of FIG. 1, the example resource allocation database 140 stores multiple monitoring profiles associated with respective CNs 102.

As used herein, a monitoring level is defined to include at least one of (1) a list of monitoring operations to be performed, (2) a testing frequency at which those monitoring operations are to be performed, (3) threshold failure conditions associated with those monitoring operations, or (4) a threshold period of time for which monitoring operations must produce a passing result before the monitoring level is decreased (a safe state threshold). Moreover, the monitoring level may be representative of a health (e.g., a system stability) of the CN. In some examples, the current monitoring level (e.g., monitoring level one, monitoring level two, monitoring level three, etc.) can be presented as an indicator of the current health of the CN.

As used herein, a monitoring profile is defined as two or more monitoring levels that may be associated with one or more of the CNs 102. As such, the example monitoring profile 141 includes multiple monitoring levels (e.g., two monitoring levels, three monitoring levels, etc.), which each identify one or more monitoring operations to be performed, and one or more rules for transitioning between various monitoring levels of the example monitoring profile 141. In some examples, resources consumed by the monitoring operations of the various monitoring levels are controlled by setting a frequency at which monitoring operations are performed by the monitoring agents. In examples disclosed herein, a rate of resource consumption (e.g., a resource consumption rate) of a first monitoring level may be different from a rate of resource consumption of a second monitoring level.

The example resource allocation database 140 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example resource allocation database 140 may additionally or alternatively be implemented by one or more double data rate (DDR) memories, such as DDR, DDR2, DDR3, mobile DDR (mDDR), etc. The example resource allocation database 140 may additionally or alternatively be implemented by one or more mass storage devices such as hard drive disk(s), compact disk drive(s), digital versatile disk drive(s), etc. While, in the illustrated example, the example resource allocation database 140 is illustrated as a single database, the example resource allocation database 140 may be implemented by any number and/or type(s) of databases.

The example monitoring resource controller 130 logs monitoring results of the example monitoring operations in the example monitoring result database 145. Logging results of the monitoring operation(s) enables later evaluation of the results so that the administrator 155 (e.g., a user, a virtual computing customer, a developer, etc.) can review the results to aid in, for example, resolving a problem of the CNs 102. The example monitoring result database 145 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example monitoring result database 145 may additionally or alternatively be implemented by one or more double data rate (DDR) memories, such as DDR, DDR2, DDR3, mobile DDR (mDDR), etc. The example monitoring result database 145 may additionally or alternatively be implemented by one or more mass storage devices such as hard drive disk(s), compact disk drive(s), digital versatile disk drive(s), etc. While in the illustrated example the example monitoring result database 145 is illustrated as a single database, the example monitoring result database 145 may be implemented by any number and/or type(s) of databases.

In the illustrated example, the administrator 155 may modify information stored in the example resource allocation database 140 via the administrator interface 150. The administrator 155 may modify the information stored in the example resource allocation database 140 to, for example, raise or lower thresholds associated with various monitoring operations (e.g., move the processor utilization threshold from 40% to 50%). Moreover, results of monitoring operation(s) stored in the monitoring result database 145 can be accessed by the administrator 155 via the administrator interface 150.

In some examples, the administrator 155 may set minimum and/or maximum monitoring levels to be used when monitoring a CN. In examples in which the monitoring level indicates the health (e.g., a stability) of a CN, setting minimum and/or maximum monitoring levels enables the administrator 155 to control a perceived health of the CN. For example, if a CN that is to be monitored executes a program that does not have a history of being stable, the administrator 155 may specify that a minimum monitoring level (e.g., monitoring level three) be used to ensure that the CN is monitored closely (e.g., the monitoring level will not drop below the set minimum monitoring level even if the safe state threshold is met). In contrast, if a CN that is known to be stable is to be monitored, the administrator 155 may specify the minimum monitoring level to be a low monitoring level (e.g., monitoring level zero) or the administrator 155 may not specify any minimum monitoring level. In some examples, the minimum and/or maximum monitoring levels are configured by modifying the monitoring profile associated with the CN.

In examples disclosed herein, the administrator interface 150 is implemented as a web page that presents diagnostic information concerning the CNs 102 (e.g., monitoring operation results stored in the example monitoring result database 145) and/or presents options for controlling monitoring operations associated with the CN (e.g., enables modification and/or configuration of the monitoring profile(s) stored in the resource allocation database 140). Additionally or alternatively, the administrator interface 150 may be implemented in any other fashion such as, for example, a graphical user interface, a file server (e.g., a file transfer protocol (FTP) server), a command line interface, etc.

Figure 2:
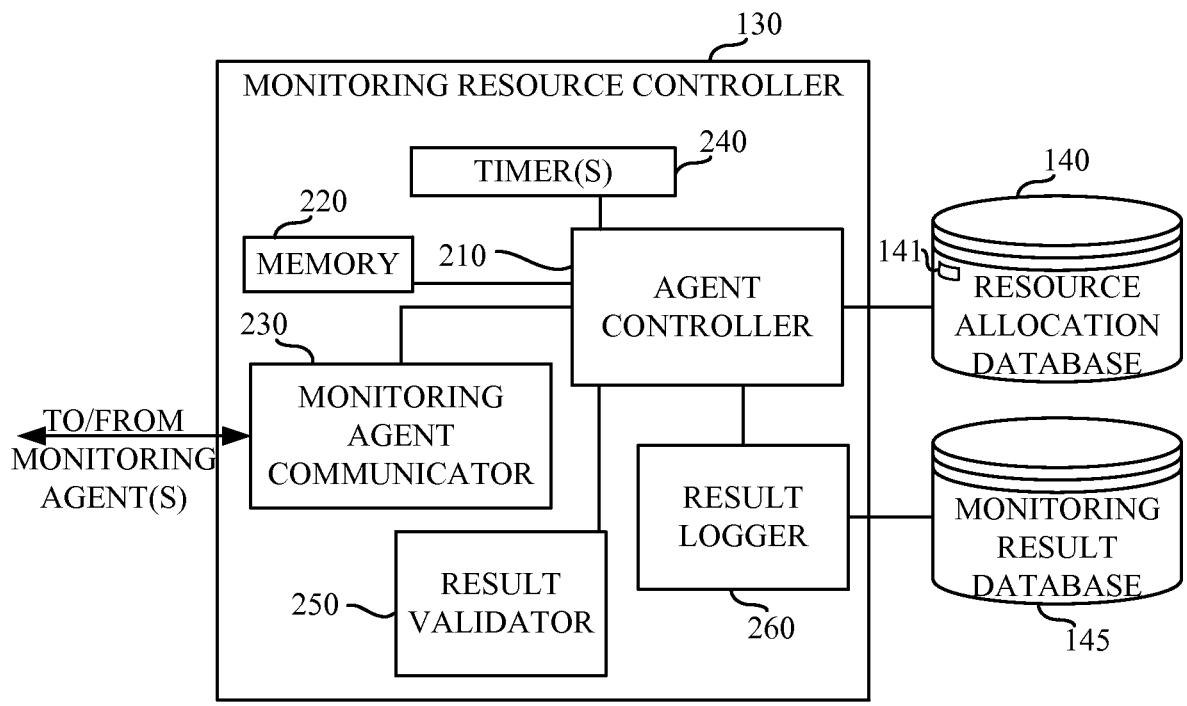
FIG. 2 is a block diagram of an example implementation of the example monitoring resource controller of FIG. 1.

FIG. 2 is a block diagram an example implementation of the example monitoring resource controller 130 of FIG. 1. The example monitoring resource controller 130 of FIG. 2 includes an example agent controller 210, an example memory 220, an example monitoring agent communicator 230, one or more example timer(s) 240, an example result validator 250, and an example result logger 260.

The example agent controller 210 interacts with the other components to control the monitoring resource utilization of the monitoring agent(s) 105 of the CNs 102. For example, the example agent controller 210 interfaces with the memory 220 to store operational data such as, for example, a monitoring level identifier, a pass/fail flag, etc. The example agent controller controls operations of the example monitoring agent(s) 105 via the example monitoring agent communicator 230. The example agent controller 210 interfaces with the one or more example timers 240 to determine when the example agent controller 210 is to instruct the example monitoring agent(s) 105 to perform monitoring operations.

The example agent controller 210 receives result(s) of the monitoring operation(s) and validates the received result(s) via the example result validator 250. The example result validator 250 analyzes the received result(s) to determine whether the results indicate that the example CNs 102 are operating within an acceptable threshold and provides a validation result to the example agent controller 210. Based on the result of the validation, the example agent controller 210 may modify the monitoring operations of the monitoring agent(s) 105 by, for example, changing a monitoring level to increase or decrease a monitoring frequency, perform additional or fewer monitoring operations (e.g., only perform a processor utilization test, perform a database latency test in addition to a processor utilization test, etc.), etc. The example result logger 260 logs results of the monitoring operation(s) in the example monitoring result database 145.

The example agent controller 210 of the illustrated example of FIG. 2 controls monitoring operation(s) of the example monitoring agent(s) 105. The example agent controller 210 monitors the example timer(s) 240 associated with the CNs 102 to determine, for example, whether to perform a monitoring operation, whether to modify a monitoring level, etc. In the illustrated example, multiple monitoring levels are defined within the example monitoring profile 141. Different monitoring profiles may be selected for use based on, for example, the type of CN being monitored. For example, a monitoring profile identifying monitoring operations to monitor a database might be used in association with a CN that hosts a database. In some examples, the monitoring profile to be used with a CN is selected automatically. However, the monitoring profile may be selected and/or configured in any other fashion, such as, by the administrator 155 via the example administrator interface 150.

To control the monitoring operations of the monitoring agent(s) 105, the example agent controller 210 determines a current monitoring level associated with the CNs 102, and performs a lookup of the example profile 141 within the resource allocation database 140 to identify (1) the testing frequency, (2) the list of monitoring operations to be performed and threshold failure conditions associated with those monitoring operations, and (3) the safe state threshold associated with those monitoring operations.

The example memory 220 stores operational data such as, for example a pass/fail flag, a current monitoring level, etc. received from the example agent controller 210. In the illustrated example, the example pass/fail flag is stored as a Boolean value (e.g., true or false). However, the example pass/fail flag may be stored in any other fashion. The example current monitoring level is stored as an integer value to represent the current monitoring level associated with a particular one of the CNs 102. However, the current monitoring level may be stored in any other fashion such as, for example, a floating point number, a text string, etc.

The example memory 220 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 220 may additionally or alternatively be implemented by one or more double data rate (DDR) memories, such as DDR, DDR2, DDR3, mobile DDR (mDDR), etc. The example memory 220 may additionally or alternatively be implemented by one or more mass storage devices such as hard drive disk(s), compact disk drive(s), digital versatile disk drive(s), etc. While in the illustrated example the example memory 220 is illustrated as a single memory, the example memory 220 may be implemented by any number and/or type(s) of memories.

The example monitoring agent communicator 230 of the illustrated example of FIG. 2 communicates with the monitoring agent(s) 105 to instruct the monitoring agent(s) 105 to perform monitoring operations. Results of the monitoring operations performed by the monitoring agent(s) 105 are received via the example monitoring agent communicator 230. In the illustrated example, the example monitoring agent communicator 230 communicates with monitoring agent(s) 105 using a secure shell (SSH) over Internet Protocol (IP) communications. However, any other approach to communicating with and/or otherwise transmitting and/or receiving instructions and/or results to and/or from the monitoring agent(s) 105 may additionally or alternatively be used such as, for example, a file transfer protocol (FTP), a hypertext transfer protocol (HTTP), asynchronous JavaScript and Extensible Markup Language (XML) (AJAX), etc. Moreover, the example monitoring agent communicator 230 may utilize non-network based techniques for communicating with the monitoring agent(s). In some examples, the monitoring agent communicator 230 communicates with the monitoring agent(s) 105 via the example manager 110 of the deployment environment 104.

The example timer(s) 240 of the illustrated example indicate and/or are used to indicate a time since a last timer reset. In the illustrated example, the timer(s) are used to determine an amount of time that has passed since the last time that a monitoring operation was instructed to be performed by a monitoring agent, an amount of time that has elapsed since a prior monitoring operation produced a passing result, etc. In examples disclosed herein, the example monitoring resource controller 130 controls monitoring operations of multiple ones of the monitoring agent(s) 105 associated with respective ones of the CNs 102. As such, multiple timers (and/or sets of timers) may be associated with each of the respective CNs 102 to identify amounts of time that have elapsed in association with each of the respective ones of the CNs 102.

The example result validator 250 of the illustrated example of FIG. 2 receives results of the monitoring operations via the agent controller 210. The example result validator 250 compares the received results to thresholds associated with the monitoring operations that produced the results. To perform the comparison, the example result validator 250 identifies the monitoring operation that was performed and performs a lookup of the thresholds for the monitoring operations in the resource allocation database 140. In some examples, the example result validator 250 additionally uses a monitoring level to perform the lookup. For example, with reference to the example table of FIG. 4, the example result validator 250 may determine that, for a processor utilization monitoring operation operating at monitoring level one (e.g., row 450 of the illustrated example of FIG. 4), the threshold is twenty-five percent processor utilization. The example result validator 250 compares the received result of the monitoring operation to the threshold associated with the monitoring operation to determine whether the monitoring operation resulted in a pass or a failure. The result of the validation is provided to the agent controller 210 which may then, if applicable, modify the monitoring level and/or the monitoring operations to be performed by the monitoring agent(s).

In response to the validation, the example agent controller 210 may transition from a first monitoring level of the monitoring profile 141 to a second monitoring level of the monitoring profile 141 associated with the CNs 102. For example, in response to a failure condition, the agent controller 210 may increment the monitoring level and thereby instruct the monitoring agent 105 to perform additional and/or more intensive monitoring operations. Alternatively, in response to a passing condition, the example agent controller 210 may decrement the monitoring level and thereby instruct the monitoring agent 105 to perform fewer and/or less intensive monitoring operations.

As disclosed herein, monitoring operations are performed to produce monitoring results that are useful for system administrators in addressing problems with the example CNs 102. To that end, the example result logger 260 stores the results of the monitoring operations in the monitoring result database 145. In some examples, the result logger 260 adds a timestamp to the result(s) when storing the results in the monitoring result database 145. Timestamping the results enables later identification of when the monitoring operation was performed.

The example data tables of FIGS. 3 and/or 4 represent the example monitoring profile 141. As noted above, the monitoring profile 141 may identify multiple monitoring levels (e.g., two monitoring levels, three monitoring levels, etc.), which each identify one or more monitoring operations to be performed, and one or more rules for transitioning between the monitoring levels of the example monitoring profile 141. FIG. 3 is an example data table 300 representing parameters associated with various monitoring levels of the example monitoring profile 141 of FIGS. 1 and/or 2 to be utilized by the example monitoring resource controller 130 of FIG. 1. FIG. 4 is an example data table 400 representing monitoring operations and failure conditions associated with the respective monitoring operations for the various monitoring levels of FIG. 3 associated with the example monitoring profile 141 to be utilized by the example monitoring resource controller 130 of FIG. 1. In the illustrated example, the example data tables 300 and 400 of FIGS. 3 and 4, respectively, are stored in the example resource allocation database 140.

The example monitoring profile 141 represented by the example data tables 300, 400 of FIGS. 3 and/or 4 is a monitoring profile to be used with a CN that provides database services. In practice, many different profiles may exist for use with many different CNs. For example, an email server monitoring profile might be used in association with an email server, a file server monitoring profile might be used in association with a file server, etc. Alternatively, some or all monitoring profiles may be generic to the type of work performed by a CN. Monitoring profiles may be modified by the administrator 155 via the administrator interface 150 to enable customization of the monitoring profile to a specific application. While the example monitoring profile 141 is represented in the illustrated examples of FIGS. 3 and/or 4 in a tabular format, any other format for representing a monitoring profile may additionally or alternatively be used. For example, the example monitoring profile 141 may be stored as an extensible markup language (XML) document, a comma separated value (CSV) document, etc.

The example data table 300 of the illustrated example of FIG. 3 includes a monitoring level column 305, a testing threshold column 310, and a safe state threshold column 315. The example monitoring level column 305 identifies different monitoring levels used in association with the monitoring profile 141. In the illustrated example of FIG. 3, three rows 330, 350, 370 representing three monitoring levels (zero, one, and two) are shown. However, the example monitoring profile 141 may have any number of levels such as, for example, two levels, five levels, ten levels, etc.

The example testing threshold column 310 of the illustrated example of FIG. 3 identifies how often monitoring operations associated with the identified monitoring level (identified by the monitoring level column 305) should be executed. Indicating a low frequency (e.g., perform monitoring operations every five minutes, ten minutes, etc.) results in low resource utilization by the monitoring agent 105. Conversely, indicating a higher frequency (e.g., perform monitoring operations every minute, every thirty seconds, every ten seconds, etc.) results in greater resource utilization by the monitoring agent 105. In the illustrated example of FIG. 3, a first monitoring level zero (row 330) indicates that monitoring operations should be performed every five minutes. That is, the example agent controller 210 will instruct the example monitoring agent 105 to perform the monitoring operations associated with the first monitoring level zero every five minutes. A second example monitoring level one (row 350) indicates that monitoring operations should be performed every two minutes (e.g., more frequently than the lower monitoring level one). A third example monitoring level two (row 370) indicates that monitoring operations should be performed every minute (e.g., more frequently than first example monitoring level zero and the second monitoring level one).

The example safe state threshold column 315 of the illustrated example of FIG. 3 identifies how long all monitoring operations must return a passing result before the selected monitoring level will be decreased. In the illustrated example, the first example monitoring level zero (row 330) does not have a safe state threshold value because, for example, the first example monitoring level (row 330) represents the least processor intensive monitoring operations that will be performed. In some alternatives, the lowest monitoring level may perform no monitoring operations and another trigger (other than a failed monitoring operation) may cause the monitoring level to increase (e.g., the monitoring level may be increased when the one of the CNs 102 that is monitored reports an error).

The second example monitoring level one (row 350) indicates that all monitoring operations must produce a passing result for at least twenty minutes before the monitoring level will be reduced to a monitoring level that utilizes less resource intensive monitoring operations (e.g., the first example monitoring level (row 330)). The third example monitoring level two (row 370) indicates that all monitoring operations must produce a passing result for at least ten minutes before the monitoring level will be reduced to a monitoring level that utilizes less resource intensive monitoring operations (e.g., the second example monitoring level one (row 350)). In some examples, the monitoring level is reduced by one level (e.g., monitoring level two is reduced to monitoring level one). However, as disclosed in connection with FIG. 5, monitoring levels may be modified in any fashion. For example, monitoring level two may be reduced to monitoring level zero (e.g., bypassing monitoring level one).

While, in the illustrated example, the safe state threshold column 315 is represented by thresholds indicating that all monitoring operations must produce a passing result for a threshold period of time, any other factors may additionally or alternatively be used to determine whether the monitoring level should be reduced. For example, an example safe state threshold may require that a threshold percentage of the monitoring operations have produced a passing result for a threshold period of time, an example safe state threshold may require that an administrator acknowledge and/or request that the monitoring level be reduced, etc.

The example data table 400 of the illustrated example of FIG. 4 includes the monitoring level column 305, an example monitoring operation column 410, and an example failure condition column 415. The example monitoring level column 305 of FIG. 4 corresponds to the example monitoring level column 305 of FIG. 3. The example data table 400 of the illustrated example includes example rows 430, 435, 450, 455, 460, 470, 475, 480, 485 that indicate monitoring operations that correspond to the monitoring level(s) of the example data table 300 of FIG. 3. For example, a first example row 430 and a second example row 435 indicate a monitoring level of zero, corresponding to the monitoring level of zero indicated by the first example row 330 of FIG. 3.

A third example row 450, a fourth example row 455, and a fifth example row 460 indicate a monitoring level of one, corresponding to the monitoring level of one indicated by the second example row 350 of FIG. 3. A sixth example row 470, a seventh example row 475, an eighth example row 480, and a ninth example row 485 indicate a monitoring level of two, corresponding to the monitoring level of two indicated by the third example row 370 of FIG. 3.

As noted above, the example data table 400 of the illustrated example of FIG. 4 includes the monitoring operation column 410. The example monitoring operation column 410 identifies a monitoring operation to be performed by the example monitoring agent 105. For example, the first example row 430 indicates that a processor utilization monitoring operation is to be performed when the monitoring level is zero. In the illustrated example of FIG. 4, different monitoring operations are identified such as, for example, a processor utilization monitoring operation (rows 430, 450, 470), a memory utilization test (rows 435, 455, 475), a database response time monitoring operation (rows 460, 480), and a disk latency test (row 485). However, any other monitoring operations may additionally or alternatively be used. For example, a network latency monitoring operation (e.g., to ensure that the example monitored one(s) of the CNs 102 is connected to a network and/or receiving network communications in a timely fashion), a permissions monitoring operation (e.g., to ensure that permissions are configured correctly), a disk utilization monitoring operation (e.g., to ensure that a particular level of disk space is available), etc., may additionally or alternatively be used.

While, in the illustrated example of FIG. 4, each monitoring level is associated with monitoring operations identified for the monitoring level (e.g., monitoring level two is associated with the monitoring operations of rows 470, 475, 480, 485), each monitoring level may inherit monitoring operations from another monitoring level. In some examples, instead of explicitly defining that monitoring level two includes a particular monitoring operation, the second monitoring level may inherit one or more monitoring operations from another monitoring level (e.g., a lower monitoring level). For example, the second monitoring level may inherit the processor utilization monitoring operation from monitoring level one (e.g., row 450) and/or monitoring level zero (e.g., row 430).

The example data table 400 of the illustrated example of FIG. 4 includes the example failure condition column 415. The example failure condition column 415 indicates parameters of the respective monitoring operation that must be obtained as a result of the testing to determine whether the monitoring operation resulted in a pass or a failure. While in the illustrated example, the example conditions of the example failure condition column 415 are represented in the negative (e.g., when a failure has occurred), the conditions may be represented in any other fashion such as, for example, in the positive (e.g., when a passing condition has occurred).

In the illustrated example of FIG. 4, different failure conditions are utilized for the same monitoring operation executed in the context of different monitoring levels. For example, whereas the processor utilization monitoring operation of monitoring level zero (row 430) indicates a failure condition when greater than 40% of the processor resources are utilized, the processor utilization monitoring operation of monitoring level one (row 450) indicates a failure condition when greater than 50% of the processor resources are utilized.

Using different thresholds enables control of the monitoring level and, accordingly, resources used by the monitoring operations. For example, a low threshold (e.g., 20% processor utilization) at a first monitoring level might cause the monitoring resource controller 130 to transition to a second monitoring level that utilizes a higher threshold (e.g., 50% processor utilization), and hold at the second monitoring level until (a) no failure conditions occur for a threshold period of time (causing the example monitoring resource controller 130 to revert to the first monitoring level), or (b) a failure condition occurs at the increased threshold (causing the example monitoring resource controller 130 to transition to a third monitoring level).

While an example manner of implementing the example monitoring resource controller 130 of the example virtual infrastructure navigator (VIN) 125 of FIG. 1 is illustrated in FIG. 2, one or more of the elements, processes and/or devices illustrated in FIG. 2 may be combined, divided, re-arranged, omitted, eliminated and/or implemented in any other way. Further, the example agent controller 210, the example memory 220, the example monitoring agent communicator 230, the example timer(s) 240, the example result validator 250, the example result logger 260, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, and/or the example administrator interface 150 of FIG. 1 may be implemented by hardware, software, firmware and/or any combination of hardware, software and/or firmware. Thus, for example, any of the example agent controller 210, the example memory 220, the example monitoring agent communicator 230, the example timer(s) 240, the example result validator 250, the example result logger 260, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, and/or the example administrator interface 150 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example agent controller 210, the example memory 220, the example monitoring agent communicator 230, the example timer(s) 240, the example result validator 250, the example result logger 260, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, and/or the example administrator interface 150 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitoring resource controller 130 of FIGS. 1 and/or 2 and/or the example VIN 125 of FIG. 1 may include one or more elements, processes and/or devices in addition to, or instead of, those illustrated in FIGS. 1 and/or 2, and/or may include more than one of any or all of the illustrated elements, processes and devices.

Figure 5:
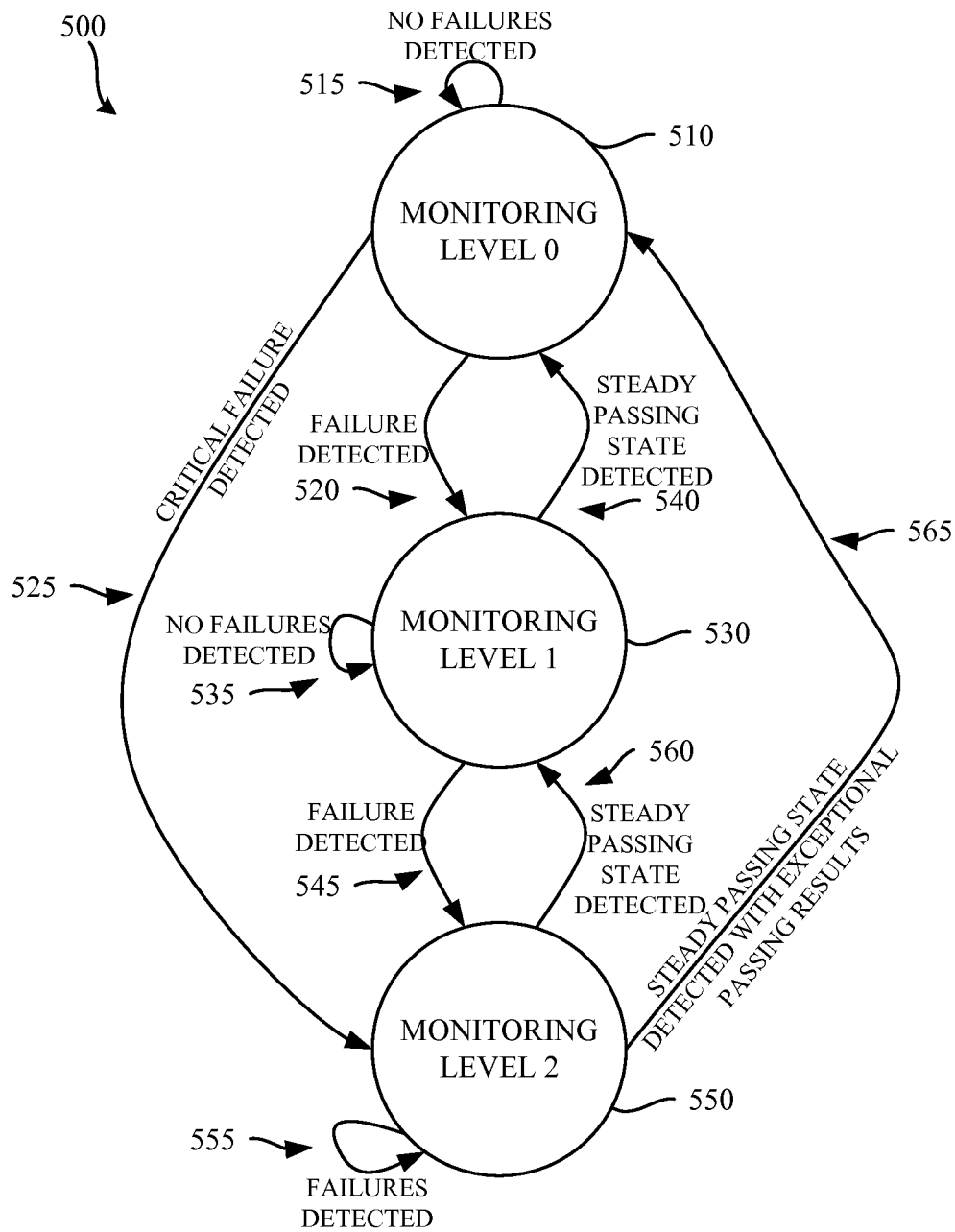
FIG. 5 is an example state diagram representing example transitions between the monitoring levels identified in the example data tables of FIGS. 3 and/or 4.

FIG. 5 is an example state diagram 500 illustrating example transitions between the monitoring levels identified in the example data tables of FIGS. 3 and/or 4. The example state diagram 500 of FIG. 5 includes three example monitoring levels: monitoring level zero 510, monitoring level one 530, and monitoring level two 550. In practice, any number of monitoring levels may additionally or alternatively be used such as, for example, two monitoring levels, five monitoring levels, ten monitoring levels, one hundred monitoring levels, etc.

As disclosed in connection with FIGS. 3 and/or 4, in the illustrated example lower monitoring levels are associated with less resources allocated to the monitoring agent 105, whereas higher monitoring levels are associated with additional resources allocated to the monitoring agent 105. Alternatively, the monitoring levels may be arranged in any fashion such as, for example, lower monitoring levels being associated with greater resources allocated to the monitoring agent 105 and higher monitoring levels being associated with lesser resources allocated to the monitoring agent.

Starting with the example monitoring level zero 510, if no failures are detected while executing monitoring operations associated with monitoring level zero 510, the example agent controller 210 keeps the monitoring level at monitoring level zero 510 (edge 515). If a failure is detected while executing monitoring operations associated with monitoring level zero 510, the example agent controller 210 increases the monitoring level to monitoring level one 530 (edge 520).

In some examples, the severity of the failure is determined and is used to identify when a critical failure has occurred. In the illustrated example, while the example agent controller 210 detects a failure by determining that a result of a monitoring operation is greater than a first threshold, the example agent controller 210 detects a critical failure by determining that the result of the monitoring operation is greater than a second threshold that is higher than the first threshold. Alternatively, instead of using an upper threshold, any other approach for determining when a failure and/or a critical failure has occurred such as, for example, a lower threshold, a range of acceptable values, etc. If the example agent controller 210 detects a critical failure, the example agent controller 210 may increase the monitoring level to a monitoring level other than monitoring level one. In the illustrated example of FIG. 5, when the example agent controller 210 detects a critical failure, the example agent controller 210 increases the monitoring level to monitoring level two 550 (edge 525).

While operating at monitoring level one 530, if the example agent controller 210 does not detect a failure while executing monitoring operations associated with monitoring level one 530, the example agent controller 210 keeps the monitoring level at monitoring level one 530 (edge 535). In the illustrated example of FIG. 5, the example agent controller 210 decreases the monitoring level when a steady passing state is detected. The example agent controller 210 detects a steady passing state when, for example, no failing results are identified for a threshold period of time. In examples where failures have not been detected for a threshold period of time (e.g., when a steady passing state has been detected), the example agent controller 210 may revert the monitoring level to monitoring level zero 510 (edge 540). If the example agent controller 210 detects a failure while executing monitoring operations associated with monitoring level one 530, the example agent controller 210 increases the monitoring level to monitoring level two 550 (edge 545).

While operating at monitoring level two 550, if the example agent controller 210 does not detect any failures while executing monitoring operations associated with monitoring level two 550, the example agent controller 210 keeps the monitoring level at monitoring level two 550 (edge 555). If the example agent controller 210 identifies passing results as a result of the monitoring operations associated with monitoring level two 550 for a threshold period of time, the example agent controller 210 reverts the monitoring level to either monitoring level one 530 (edge 560) or monitoring level zero 510 (edge 565). In the illustrated example, the level to which the monitoring level is reverted is determined based on an exceptionality of the passing result. Similar to the determination of whether a failure is critical, the example agent controller 210 identifies exceptional passing results when the results indicate that a need for more resource intensive monitoring operations has passed. In the illustrated example, whereas the example agent controller 210 detects a passing result by determining that a result of a monitoring operation is less than the first threshold, the example agent controller 210 detects an exceptional passing result by determining that the result of the monitoring operation is less than a second threshold that is lower than the first threshold. Alternatively, instead of using a lower threshold, any other approach to determining when an exceptional passing result has occurred such as, for example, a higher threshold, a range of acceptable values, etc.

In situations where exceptional passing results are identified, the monitoring level may be decreased to a level that is not immediately adjacent the current monitoring level (e.g., decrease from monitoring level two to monitoring level zero, decrease two levels, decrease three levels, decrease to a level at which the monitoring operations had been occurring for a period of time prior to the problem that caused the monitoring level to increase, decrease directly to the lowest level, etc.). Such a transition is shown in the example edge 565. In some examples, the monitoring level is decreased without respect to whether a steady passing state is detected. For example, the monitoring level may be decreased only when an exceptional passing result is identified.

In the illustrated example of FIG. 5, the example agent controller 210 decreases the monitoring level when the steady passing state is detected. As noted above, the steady passing state is detected when, for example, no failing results are identified for a threshold period of time. In examples disclosed herein, the thresholds associated with various monitoring levels are different. For example, referring to the example data table 300 of FIG. 3, row 350 indicates that the safe state threshold for monitoring level one is twenty minutes, whereas row 370 indicates that the safe state threshold for monitoring level two is ten minutes. However, in some examples, the threshold associated with various monitoring levels may be the same. In examples where failures have not been detected for a threshold period of time (e.g., when a steady passing state has been detected), the monitoring level may be reverted to monitoring level one 530 (edge 560).

Figure 6:
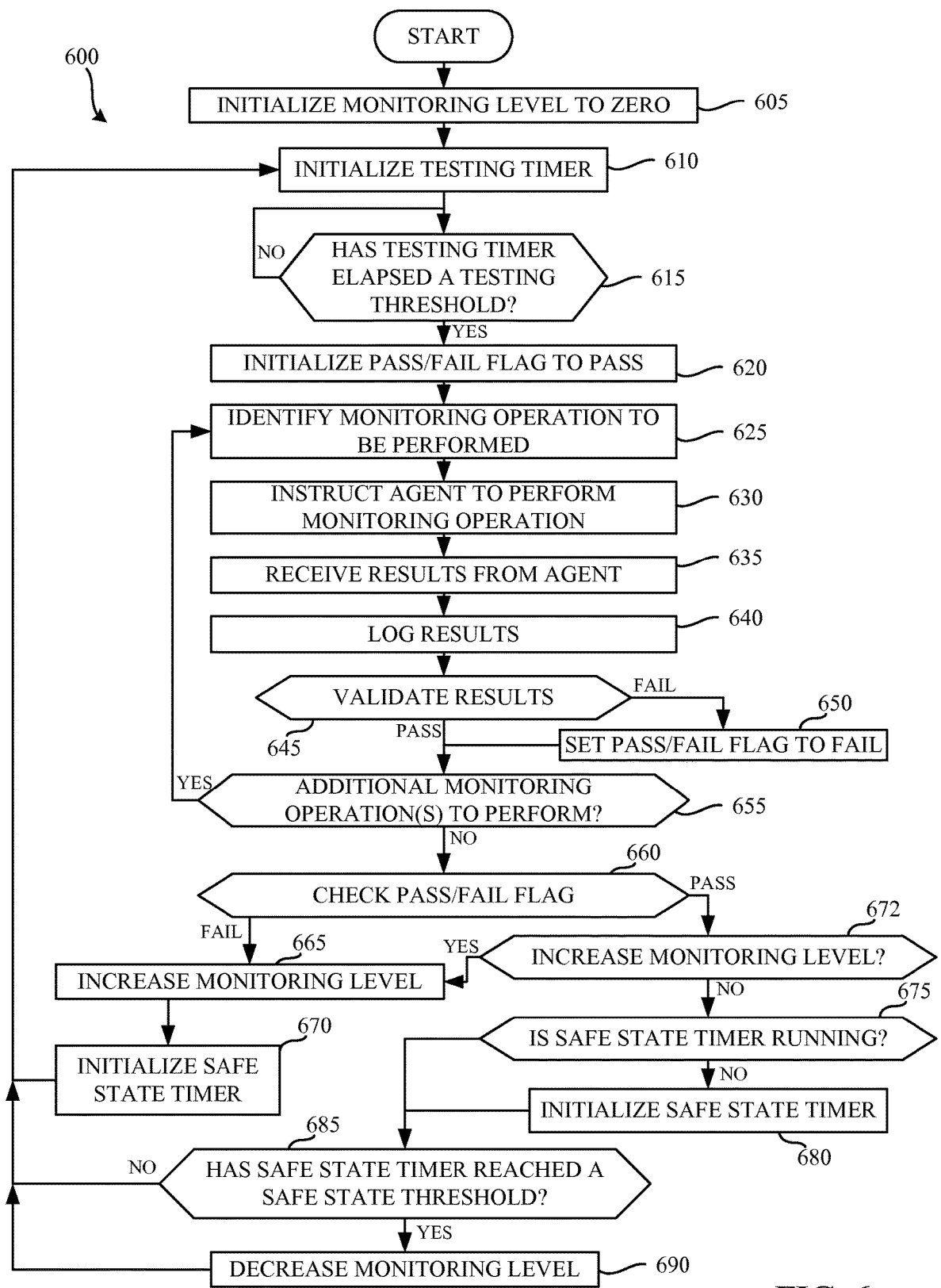
FIG. 6 is a flow diagram representative of example machine readable instructions that may be executed to implement the example monitoring resource controller of FIG. 1 to control monitoring resource utilization of a compute node.

A flowchart representative of example machine readable instructions for implementing the example monitoring resource controller 130 of FIGS. 1 and/or 2 is shown in FIG. 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example monitoring resource controller 130 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 600 of FIG. 6 begins at block 605 when the example agent controller 210 initializes a monitoring level variable stored in the example memory 220. (Block 605). In the illustrated example, the monitoring level is initialized to zero (e.g., the least resource intensive monitoring level). However, the monitoring level may be initialized to any other value. For example, the monitoring level may be initialized to a least resource intensive monitoring level, a most resource intensive monitoring level, an intermediate monitoring level, a minimum monitoring level specified by the administrator 155, etc.

The example agent controller 210 initializes a testing timer of the example timers 240. (Block 610). In the illustrated example, the testing timer represents a time since a last monitoring operation was performed. However, in some examples, the testing timer may represent a time at which the last monitoring operation was performed and the time since the last monitoring operation was performed may be calculated using the time at which the last monitoring operation was performed and a current time. In the illustrated example, the testing timer is initialized to zero. According to the illustrated example, the example agent controller 210 will wait until the testing timer reaches a first threshold before instructing the monitoring agent 105 to perform a monitoring operation. However, in some examples, the example agent controller 210 may begin the example process 600 by initializing the testing timer to a non-zero value to, for example, ensure that the first instruction(s) to perform a monitoring operation is transmitted to the monitoring agent 105 without delay.

The example agent controller 210 then determines whether the testing timer indicates a time that is greater than or equal to the testing threshold (frequency). (Block 615). The example agent controller 210 determines whether the testing timer indicates the time that is greater than or equal to the testing threshold by identifying a monitoring level and an identity of the monitoring profile and performing a lookup against the resource allocation database 140 to determine the testing threshold associated with the current combination of monitoring level and monitoring profile. For example, if the current monitoring level were zero, the example agent controller 210 consults row 330 of the example data table 300 of FIG. 3 to identify that the testing threshold is five minutes (indicating that monitoring operations are to be performed every five minutes). The example agent controller 210 continues to determine whether the time indicated by the testing timer indicates a time that is greater than or equal to the identified testing threshold (e.g., until block 615 produces a result of YES).

The example agent controller 210 then initializes a pass/fail flag stored in the memory 220. (Block 620). In the illustrated example, the pass/fail flag is initialized to a passing value (e.g., a "true" Boolean value). However, in some examples, the example pass/fail flag may be initialized to a failing value. The example agent controller 210 then identifies one or more monitoring operations to be performed. (Block 625). In the illustrated example, the example agent controller 210 identifies the monitoring operations by performing a lookup of the monitoring operations in the example resource allocation database 140 of FIG. 1. In the illustrated example, the lookup is performed using the currently identified monitoring level. However, in some examples, the lookup may be performed to identify monitoring operations associated with the current monitoring level and other monitoring levels. For example, the lookup may identify monitoring operations associated with the current monitoring level and inherited monitoring level(s) (e.g., other monitoring levels that are inherited by the current monitoring level). For example, monitoring level two may inherit the monitoring operations of monitoring level one and/or monitoring level zero.

In some examples, the example agent controller 210 additionally uses an identifier of the monitoring profile to perform the lookup. However, any other information may additionally or alternatively be used. An example lookup of the monitoring level may be performed with respect to the example data table 400 of FIG. 4. To, for example, identify monitoring operations to be performed when the monitoring level is zero, the example agent controller 210 selects rows 430 and 435, which are associated with a monitoring level of zero.

The example agent controller 210 then instructs the monitoring agent 105 to perform the monitoring operation(s) via the example monitoring agent communicator 230. (Block 630). The monitoring agent 105 performs the monitoring operation(s) and reports the result of the monitoring operation(s) to the agent controller 210 via the example monitoring agent communicator 230. (Block 635). The example result logger 260 logs the result of the monitoring operation in the monitoring result database 145. (Block 640). In the illustrated example of FIG. 6, the example result logger 260 logs all results to the monitoring result database 145. However, in some examples, the result logger 260 selectively logs results. For example, the result logger 260 may log results when the monitoring level is above a result logging threshold. For example, results of the monitoring operation may be logged when the monitoring level is non-zero. Selectively logging results reduces the amount of storage space that is required to store results that are achieved when the CNs 102 are operating properly.

The example result validator 250 validates the results of the monitoring operation. (Block 645). In the illustrated example, the example result validator 250 performs a lookup of the monitoring operation and monitoring level in the example resource allocation database 140 to identify an acceptable threshold of the result of the monitoring operation. For example, with reference to the example table of FIG. 4, the example result validator 250 may determine that for a processor utilization monitoring operation operating at monitoring level one (e.g., row 450 of the illustrated example of FIG. 4), the threshold is twenty-five percent processor utilization. The example result validator 250 compares the received result of the monitoring operation to the threshold associated with the monitoring operation to determine whether the monitoring operation resulted in a pass or a failure. If the monitoring operation resulted in a failure (Block 645, FAIL), the example agent controller 210 sets the pass/fail flag to fail. (Block 650).

If the monitoring operation resulted in a pass, (Block 645, PASS), control proceeds to block 655, where the example agent controller 210 determines whether there are additional monitoring operations to be performed. (Block 655). According to the illustrated example, the example agent controller 210 does not change the pass/fail flag to pass at this time. With respect to the example identification of monitoring operations performed against the example data table 400 of FIG. 4 while at monitoring level zero, there are two monitoring operations to be performed (rows 430, 435). If there are additional monitoring operations to be performed (e.g., not all of the operations identified in the lookup of Block 625 have been performed), control proceeds to block 625 where the subsequent monitoring operations are identified (Block 625). In some examples, the example agent controller 210 identifies monitoring operations associated with lower monitoring levels. For example, when at monitoring level one, the monitoring operations associated with monitoring level zero may additionally be performed.

The process of blocks 625-655 is repeated until all monitoring operations for the current monitoring level (and any inherited monitoring level(s)) have been performed (e.g., until block 655 produces a NO result). In the illustrated example, the monitoring operations are performed serially.

However, in some examples, the monitoring operations may be performed in parallel. Moreover, the example monitoring operations are performed at substantially the same time. As used herein, performing monitoring operations at substantially the same time is defined to be performing two or more operations such that the start and/or end of the two monitoring operations are no more than one minute apart from each other.

In the illustrated example, once all monitoring operations associated with the current monitoring level have been performed (Block 655, NO), the example agent controller 210 checks the pass/fail flag to determine whether any monitoring operations resulted in the pass/fail flag being set to fail (e.g., by block 650). If the pass/fail flag is/has been set to fail (Block 660, FAIL), the example agent controller 210 increases the monitoring level (Block 665). Increasing the monitoring level results in additional and/or more resource intensive monitoring operations being performed and/or monitoring operations being performed more frequently by the monitoring agent 105. In some examples, the monitoring level is incremented and/or otherwise moved from a first level to a second level that is immediately adjacent the first level (e.g., incremented from monitoring level one to monitoring level two, incremented from monitoring level two to monitoring level three). However, the monitoring level may be increased in any other fashion. In some examples, the example agent controller 210 identifies a severity of the failure(s) that caused the monitoring level to be increased and increases the monitoring level based on the severity of the failure. For example, if the current monitoring level were zero and a processor utilization monitoring operation indicated that the processor was operating at one hundred percent utilization, the monitoring level may be increased to three (e.g., skipping monitoring levels one and two).

In the illustrated example, the example agent controller 210 represents the example monitoring level in integer levels (e.g., zero, one, two, etc.). However, the monitoring level may be represented in any other fashion such as, for example, a floating point number, a hexadecimal character, etc. In such an example, the example agent controller 210 may increase the monitoring level in increments less than a whole number (e.g., one half, one quarter, etc.) Moreover, the example agent controller 210 may increase the monitoring level by a value based on a severity of the failure. For example, if the processor utilization threshold were 50% and the monitoring operation identified a processor utilization of 51%, the example result validator 250 would determine the current processor utilization to be a failure. However, the severity of the failure is low (because 51% is not much more than 50%) and, as such, the failure might not be a cause for alarm. The example agent controller 210 might increase the monitoring level by a value that corresponds to the severity of the failure (e.g., one tenth, one half, etc.). When determining the monitoring level (e.g., in block 625), the example agent controller 210 may perform a mathematical rounding operation (e.g., rounding up, rounding down, etc.) to identify the appropriate monitoring level based on a partial value indicating a monitoring level (e.g., a value of 0.7 may represent a monitoring level of zero where partial values are rounded down to the nearest integer, a value of 1.3 may represent a monitoring level of one where the value is rounded to the nearest integer, etc.)

In some examples, the example controller 210 identifies a severe failure when, for example, the failure was produced by a result that is more than a second threshold number (e.g., twenty, thirty, etc.) of units (e.g., percentage points, milliseconds, etc.) above the threshold of the failure condition. For example, if a processor utilization monitoring operation having a failure condition of greater than 50% utilization produces a result greater than 70% utilization (e.g., the regular threshold plus 20%), the failure may be identified as a severe failure. When a severe failure is identified, the monitoring level may be increased by multiple levels to more quickly produce detailed monitoring results.

Returning to block 665, after the monitoring level has been increased, the example agent controller 210 initializes a safe state timer provided by the timers 240. (Block 670). The safe state timer represents a time since a last failure condition was detected. In the illustrated example, the example safe state timer is initialized to zero, and counts upwards towards a threshold time. However, in some examples, the safe state timer may be initialized to the threshold time and count down to zero. The example safe state timer is used to determine when a monitoring level should be decreased (e.g., when a safe state has been reached). Control then proceeds to block 610, where the example agent controller re-initializes the testing timer (Block 610), and determines whether the testing timer has elapsed the first threshold. (Block 615). The example process of blocks 610-660 is then repeated to continually monitor the example CNs 102.

Returning to block 660, if the example agent controller 210 determines that the pass/fail flag was set to pass (Block 660, PASS) (e.g., no failure conditions have been detected since the pass/fail flag was initialized in block 620), the example agent controller 210 determines whether there is some other reason to increase the monitoring level. (Block 672). In some examples, the example agent controller 210 considers factors other than the pass/fail flag to determine whether the monitoring level should be increased. For example, the example agent controller 210 may determine that a periodic timer has elapsed indicating that the monitoring level should be increased. In some examples, the periodic timer expires, causing the monitoring level to be increased without regard for whether the pass/fail flag indicated a pass or a failure. In some examples, lower monitoring levels may not provide enough information to adequately trigger an increase of a monitoring level at an appropriate time. For example, a problem condition may be occurring, but may not be detected by the monitoring operations performed at a lower monitoring level. To account for such a situation, the agent controller 210 may periodically increases the monitoring level to ensure that monitoring operations associated with the increased monitoring level do not indicate an error state.

The example agent controller 210 may consider any other factors when determining whether to increase the monitoring level. (Block 672). For example, the example agent controller 210 may determine whether an instruction from the administrator 155 has been received to increase the monitoring level. Additionally or alternatively, external stimuli may cause the example agent controller 210 to determine that the monitoring level should be increased. For example, an indication of an attack against another one of the CNs 102 (e.g., a distributed denial or service attack (DDOS), etc.) may cause a heightened level of scrutiny on the one of the CNs 102 under analysis, and may warrant an increase in the monitoring level.

If the monitoring level is not to be increased (Block 672 returns a result of NO), the example agent controller 210 determines whether the safe state timer is running (Block 675). If, for example, the example agent controller 210 determines that the example safe state timer is not running (Block 675, NO), the example agent controller 210 initializes the safe state timer. (Block 680). The check and initialization of blocks 675 and 680 are useful when, for example, the example monitoring resource controller 130 has just begun monitoring one of the CNs 102 and has not encountered a failure condition.

The example agent controller 210 determines whether the safe state timer has elapsed a safe state threshold. (Block 685). In the illustrated example, the example agent controller 210 identifies the safe state threshold by performing a lookup within the example resource allocation database 140 using the currently selected monitoring level. For example, with reference to the example data table 300 of FIG. 3, at monitoring level one, the example agent controller determines that the safe state threshold is twenty minutes. If the safe state timer has not reached the safe state threshold (e.g., twenty minutes), the monitoring level should remain the same (e.g., be unchanged). Control then proceeds to block 610, where the example process of blocks 610 through 685 is repeated until the safe state timer reaches the safe state threshold. (Block 685, YES).

Once the example agent controller 210 determines that the safe state timer has reached the safe state threshold (Block 685), the example agent controller 210 decreases the monitoring level. (Block 690). In the illustrated example, decreasing the monitoring level results in fewer and/or less resource intensive monitoring operations being performed and/or being performed less frequently by the monitoring agent 105. In the illustrated example, the monitoring level is decremented by an integer value. However, the example agent controller 210 may decrease the monitoring level by any other value. For example, the example agent controller 210 may decrease the monitoring level by multiple monitoring levels (e.g., the monitoring level may be decreased from monitoring level two to monitoring level zero.). The example monitoring level may be decreased by multiple monitoring levels to, for example, ensure that after passing conditions are detected, that the resources allocated to the monitoring agent are reduced.

In some examples, the example controller 210 identifies an exceptional passing result when, for example, the result of the monitoring operation is less than a threshold number (e.g., twenty, thirty, etc.) of units (e.g., percentage points, milliseconds, etc.) below the threshold of the failure condition. For example, if a processor utilization monitoring operation that has a failure condition of greater than 50% utilization produces a result less than 30% utilization, the passing result may be identified as an exceptional passing result (e.g., a result that is more than 20% below the failure threshold). When an exceptional passing result is identified, the monitoring level may be decreased by multiple levels to more quickly reduce the amount of monitoring resources allocated to the monitoring agent. In some examples, an exceptional passing result may cause the safe state timer threshold to be ignored. For example, if the safe state timer will not reach the safe state threshold for another ten minutes, but an exceptional passing result is identified (indicating that the problem condition that triggered the additional monitoring resources to be allocated has passed), the example agent controller may immediately decrease the monitoring level (Block 690) to reduce the amount of allocated monitoring resources.

Once the monitoring level has been decreased (Block 690), control proceeds to block 610, where the example process of blocks 610 through 690 is repeated to enable continual monitoring of the example CNs 102.

Figure 7:
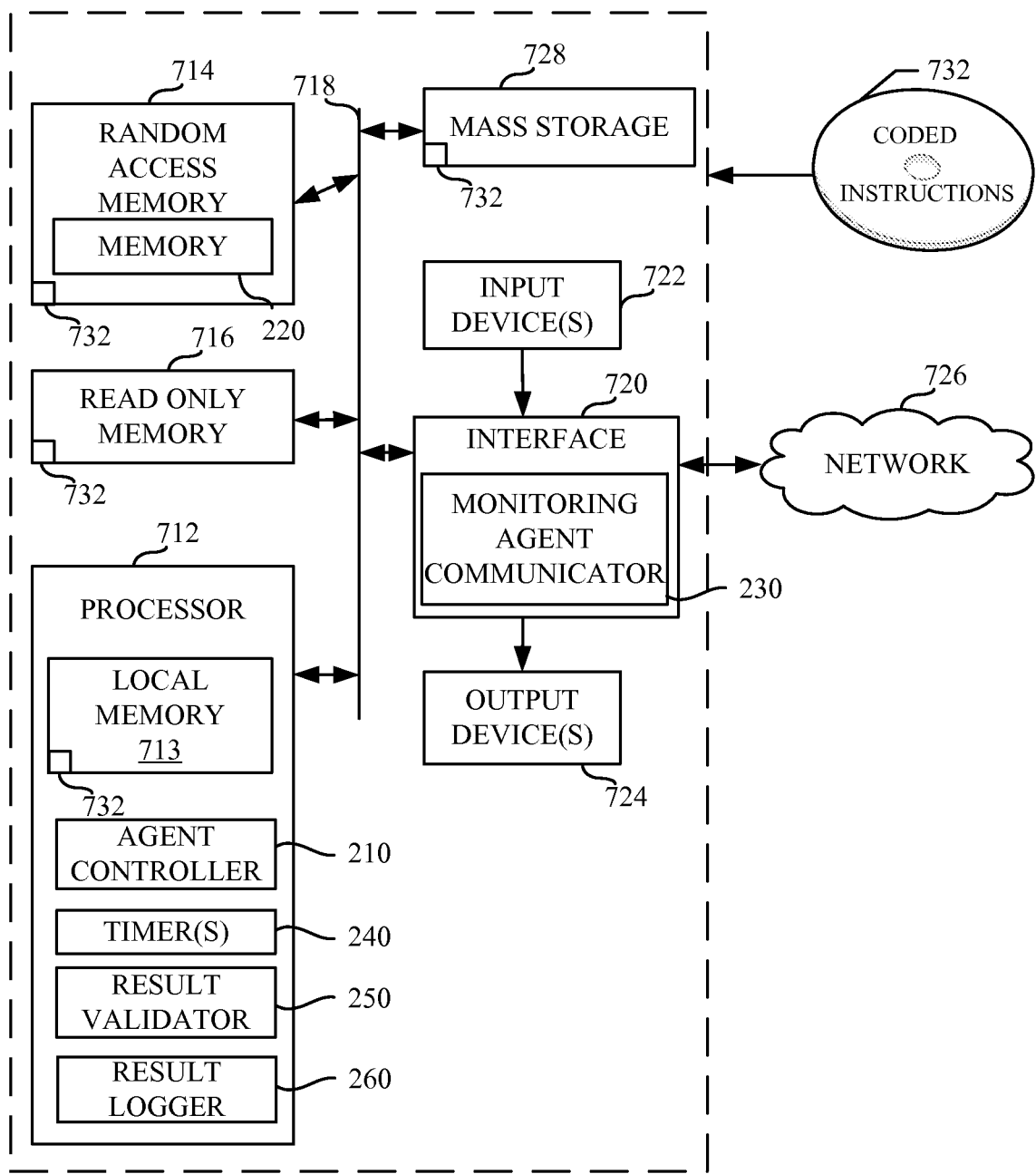
FIG. 7 is a block diagram of an example monitoring resource controller structured to execute the example machine-readable instructions of FIG. 6 to implement the example virtual infrastructure navigator of FIG. 1.

FIG. 7 is a block diagram of an example processor platform 700 capable of executing the instructions of FIG. 6 to implement the example monitoring resource controller 130 of FIGS. 1 and/or 2. The processor platform 700 can be, for example, a server, a personal computer, an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache), and executes instructions to implement the example agent controller 210, the example timer(s) 240, the example result validator 250, and/or the example result logger 260. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. In the illustrated example of FIG. 7, the example volatile memory 714 implements the example memory 220. However, the example memory 220 may be implemented in any other fashion.

The processor platform 700 of the illustrated example also includes an interface circuit 720. The interface circuit 720 may be implemented by any type of interface standard, such as an Ethernet interface, a universal serial bus (USB), and/or a PCI express interface. The example interface 720 implements the example monitoring agent communicator 230.

In the illustrated example, one or more input devices 722 are connected to the interface circuit 720. The input device(s) 722 permit(s) a user to enter data and commands into the processor 712. The input device(s) can be implemented by, for example, a keyboard, a button, a mouse, and/or a touchscreen.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture control resource utilization of monitoring agents.

As noted above, virtual computing customers are put in a situation where they must either enable the monitoring agent(s) and risk monitoring a system when such monitoring is unnecessary (perhaps even increasing the cost of operating such systems), or disable the monitoring agent(s) and risk a lack of information in the event of a problem. Example methods and apparatus disclosed herein enable dynamic resource allocation to monitoring agents, thereby ensuring that monitoring operations do not consume more resources than necessary.

Moreover, example methods and apparatus disclosed herein conserve resources not only with respect to an individual CN being monitored, but conserve computing resources across the entire deployment environment. For example, if a deployment environment implements one hundred CNs, reducing the computing resources used to monitor those CNs frees up significant computing resources for other CNs to be operated (e.g., to perform useful operations). That is, the existing physical resources used to host the CNs operate more efficiently. Additionally or alternatively, reducing the computing resources used to monitor those CNs enables reductions in the physical resources used by the deployment environment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to control resource utilization of monitoring agents, the method comprising:

instructing, by executing an instruction using a processor, a monitoring agent of a compute node to perform a first monitoring operation associated with a first monitoring level from a set of monitoring levels including the first monitoring level and a second monitoring level associated with a second monitoring operation different than the first monitoring operation, the second monitoring operation allocating more computing resources than the first monitoring operation, the first monitoring operation to identify whether respective ones of first virtual resources associated with the compute node satisfy respective ones of first failure condition thresholds, the second monitoring operation to identify whether respective ones of second virtual resources associated with the compute node satisfy respective ones of second failure condition thresholds, the second failure condition thresholds different than the first failure condition thresholds, one or more of the second virtual resources different than one or more of the first virtual resources;

in response to the first monitoring operation returning a first failing result:

instructing, by executing an instruction using the processor, the monitoring agent to operate at the second monitoring level with the second monitoring operation to gather additional information to determine whether the respective ones of the second virtual resources satisfy the respective ones of the second failure condition thresholds; and initiating a timer after a first passing result subsequent the first failing result, the timer representative of a second duration of time since a last failing result was detected, the timer to be reset if a subsequent failing result is returned, the second duration of time corresponding to the second monitoring level, the first passing result representative of at least one of (i) one or more of the first virtual resources satisfying a corresponding one of the second failure condition thresholds or (ii) the one or more of the first virtual resources satisfying a corresponding one of the first failure condition thresholds;

in response to the timer reaching the second duration of time, the second monitoring operation not returning a failing result within the second duration of time, and determining that the first passing result is representative of the one or more of the first virtual resources satisfying the corresponding one of the second failure condition thresholds while operating in the second monitoring level, instructing, by executing an instruction using the processor, the monitoring agent to return to the first monitoring level with the first monitoring operation to conserve a first quantity of computing resources; and in response to the timer reaching the second duration of time, the second monitoring operation not returning a failing result within the second duration of time, and determining that the first passing result is representative of the one or more of the first virtual resources satisfying a corresponding one of the first failure condition thresholds while operating in the second monitoring level, instructing, by executing an instruction using the processor, the monitoring agent to transition to a third monitoring level to conserve a second quantity of the computing resources greater than the first quantity of the computing resources.

2. The method as disclosed in claim 1, wherein the first monitoring level represents a health of the compute node.

3. The method as disclosed in claim 1, wherein the first monitoring level is a minimum monitoring level selected by an administrator.

4. The method as disclosed in claim 1, wherein the first monitoring level identifies a list of monitoring operations to be performed in association with the first monitoring level, the list of monitoring operations including the first monitoring operation.

5. The method as disclosed in claim 1, wherein the first monitoring level identifies a frequency at which the first monitoring operation is to be performed.

6. The method as disclosed in claim 1, wherein the second monitoring operation is allocated additional computing resources than the first monitoring operation by executing the second monitoring operation more frequently than the first monitoring operation.

7. The method as disclosed in claim 1, further including, in response to the first monitoring operation returning a result being within an acceptable threshold, identifying the third monitoring level associated with a third monitoring operation that is allocated less computing resources than the first monitoring operation associated with the first monitoring level.

8. The method as disclosed in claim 1, wherein the timer is a first timer, the identifying of the second monitoring level further performed in response to a second timer elapsing a threshold.

9. The method as disclosed in claim 8, wherein the threshold represents a period of time following a time associated with the first monitoring operation returning a first result that is outside of an acceptable threshold.

10. The method as described in claim 1, further including determining a severity of the first failing result, wherein identifying the second monitoring level is based on the severity of the first failing result.

11. An apparatus to control resource utilization of monitoring agents, the apparatus comprising:
agent controlling means for identifying a first monitoring level to be used when monitoring a compute node;
monitoring agent communication means for instructing a monitoring agent of the compute node to perform a first monitoring operation associated with the first monitoring level from a set of monitoring levels including the first monitoring level and a second monitoring level associated with a second monitoring operation different from the first monitoring operation, the second monitoring operation allocating more computing resources than the first monitoring operation, the first monitoring operation to identify whether respective ones of first virtual resources associated with the compute node satisfy respective ones of first failure condition thresholds, the second monitoring operation to identify whether respective ones of second virtual resources associated with the compute node satisfy respective ones of second failure condition thresholds, the second failure condition thresholds different than the first failure condition thresholds, one or more of the second virtual resources different than one or more of the first virtual resources; and
result validation means for identifying at least one of a passing result or a failing result based on at least one of the first or second monitoring operations, the agent controlling means to:
in response to the result validation means identifying a first failing result corresponding to the first monitoring operation:
instruct the monitoring agent to operate at the second monitoring level with the second monitoring operation to gather additional information to determine whether the respective ones of the second virtual resources satisfy the respective ones of the second failure condition thresholds; and
initiate a timer after a first passing result subsequent the first failing result, the timer representative of a second duration of time since a last failing result was detected, the second duration of time corresponding to the second monitoring level, the first passing result representative of at least one of (i) one or more of the first virtual resources satisfying a corresponding one of the second failure condition thresholds or (ii) the one or more of the first virtual resources satisfying a corresponding one of the first failure condition thresholds;
in response to the timer reaching the second duration of time, the second monitoring operation returning a second passing result for the second duration of time, and determining that the first passing result is representative of the one or more of the first virtual resources satisfying the corresponding one of the second failure condition thresholds while operating in the second monitoring level, instruct the monitoring agent to return to the first monitoring level with the first monitoring operation to conserve a first quantity of computing resources; and
in response to the timer reaching the second duration of time, the second monitoring operation not returning a failing result within the second duration of time, and determining that the first passing result is representative of the one or more of the first virtual resources satisfying a corresponding one of the first failure condition thresholds while operating in the second monitoring level, instruct the monitoring agent to transition to a third monitoring level to conserve a second quantity of the computing resources greater than the first quantity of the computing resources.

12. The apparatus of claim 11, wherein:
the monitoring agent communication means are to instruct the monitoring agent to perform a fourth monitoring operation associated with a fourth monitoring level different than the first and second monitoring operations, the fourth monitoring operation allocating more computing resources than the second monitoring operation; and
the agent controlling means are to, when the second monitoring operation returns a second failing result within the second duration of time, instruct the monitoring agent to operate at the fourth monitoring level with the fourth monitoring operation for a third duration of time corresponding to the fourth monitoring level.

13. The apparatus of claim 12, wherein the agent controlling means are to, in response to the result validation means detecting a critical failing result corresponding to the first monitoring operation, instruct the monitoring agent to operate at the fourth monitoring level with the fourth monitoring operation for the third duration of time corresponding to the fourth monitoring level.

14. The apparatus as disclosed in claim 13, wherein the critical failing result is detected when a result of a monitoring operation is greater than a second threshold that is higher than a first threshold.

15. The apparatus of claim 12, wherein the agent controlling means are to, when the fourth monitoring operation returns a result that is less than a second threshold that is lower than a first threshold associated with the second monitoring level, instructing the monitoring agent to directly return to the first monitoring level with the first monitoring operation.

16. The apparatus of claim 12, wherein utilizing the second monitoring level includes utilizing the first and second monitoring operations and the fourth monitoring level includes utilizing the first, second, and fourth monitoring operations.

17. A tangible machine-readable storage medium comprising instructions which, when executed, cause a machine to at least:
instruct a monitoring agent of a compute node to perform a first monitoring operation associated with a first monitoring level from a set of monitoring levels including the first monitoring level and a second monitoring level associated with a second monitoring operation different than the first monitoring operation, the second monitoring operation allocating more computing resources than the first monitoring operation, the first monitoring operation to identify whether respective ones of first virtual resources associated with the compute node satisfy respective ones of first failure condition thresholds, the second monitoring operation to identify whether respective ones of second virtual resources associated with the compute node satisfy respective ones of second failure condition thresholds, the second failure condition thresholds different than the first failure condition thresholds, one or more of the second virtual resources different than one or more of the first virtual resources;

in response to the first monitoring operation returning a first failing result:

instruct the monitoring agent to operate at the second monitoring level with the second monitoring operation to gather additional information to determine whether the respective ones of the second virtual resources satisfy the respective ones of the second failure condition thresholds; and initiate a timer representative of a second duration of time since a last failing result subsequent the first failing result was detected, the timer being reset if a subsequent failing result occurs, the second duration of time corresponding to the second monitoring level, the first passing result representative of at least one of (i) one or more of the first virtual resources satisfying a corresponding one of the second failure condition thresholds or (ii) the one or more of the first virtual resources satisfying a corresponding one of the first failure condition thresholds;

in response to the timer reaching the second duration of time, the second monitoring operation returning a second passing result for the second duration of time, and determining that the first passing result is representative of the one or more of the first virtual resources satisfying the corresponding one of the second failure condition thresholds while operating in the second monitoring level, instruct the monitoring agent to return to the first monitoring level with the first monitoring operation to conserve a first quantity of computing resources; and in response to the timer reaching the second duration of time, the second monitoring operation not returning a failing result within the second duration of time, and determining that the first passing result is representative of the one or more of the first virtual resources satisfying a corresponding one of the first failure condition thresholds while operating in the second monitoring level, instruct the monitoring agent to transition to a third monitoring level to conserve a second quantity of the computing resources greater than the first quantity of the computing resources.

18. The tangible machine-readable storage medium as disclosed in claim 17, wherein the second monitoring operation is allocated additional computing resources than the first monitoring operation in response to instructing the monitoring agent to execute the second monitoring operation more frequently than the first monitoring operation.

19. The tangible machine-readable storage medium as disclosed in claim 17, wherein the instructions, when executed, cause the machine to, in response to the first monitoring operation returning a passing result, identify the third monitoring level associated with a monitoring operation that is allocated less computing resources than the first monitoring operation associated with the first monitoring level.

20. The tangible machine-readable storage medium of claim 17, wherein the instructions, when executed, cause the machine to:

instruct the monitoring agent to perform a fourth monitoring operation associated with a fourth monitoring level different than the first and second monitoring operations, the fourth monitoring operation allocating more computing resources than the second monitoring operation; and when the second monitoring operation returns a second failing result within the second duration of time, instruct the monitoring agent to operate at the fourth monitoring level with the fourth monitoring operation for a third duration of time corresponding to the fourth monitoring level.

21. The tangible machine-readable storage medium of claim 20, wherein the instructions, when executed, cause the machine to, in response to the detecting of a critical failing result corresponding to the first monitoring operation, instruct the monitoring agent to operate at the fourth monitoring level with the fourth monitoring operation for the third duration of time corresponding to the fourth monitoring level.

22. The tangible machine-readable storage medium of claim 20, wherein the instructions, when executed, cause the machine to, when the fourth monitoring operation returns a result that is less than a second threshold that is lower than a first threshold associated with the second monitoring level, instructing the monitoring agent to directly return to the first monitoring level with the first monitoring operation.

* * * * *